US008295638B2

(12) United States Patent
Tsuda et al.

(10) Patent No.: US 8,295,638 B2
(45) Date of Patent: Oct. 23, 2012

(54) IMAGE DISPLAY CONTROL DEVICE, IMAGE DISPLAY METHOD, AND INFORMATION STORAGE MEDIUM

(75) Inventors: Munetaka Tsuda, Tokyo (JP); Koichi Sato, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 848 days.

(21) Appl. No.: 12/376,240

(22) PCT Filed: Jun. 13, 2007

(86) PCT No.: PCT/JP2007/061884
§ 371 (c)(1),
(2), (4) Date: Apr. 9, 2009

(87) PCT Pub. No.: WO2008/020506
PCT Pub. Date: Feb. 21, 2008

(65) Prior Publication Data
US 2009/0268987 A1 Oct. 29, 2009

(30) Foreign Application Priority Data
Aug. 18, 2006 (JP) ................................ 2006-222965

(51) Int. Cl.
*G06K 9/40* (2006.01)
(52) U.S. Cl. ........ 382/274; 382/195; 382/164; 382/173; 382/305; 348/231.3; 348/240.2; 348/294
(58) Field of Classification Search ............... 382/274, 382/162, 164, 173, 305; 348/231.3, 240.2, 348/294
See application file for complete search history.

(56) References Cited

U.S. PATENT DOCUMENTS 6,362,850 B1 * 3/2002 Alsing et al. ................. 348/239
2006/0132482 A1 * 6/2006 Oh ............................... 345/419

FOREIGN PATENT DOCUMENTS

JP        200277762 A        3/2002
(Continued)

OTHER PUBLICATIONS

International Search Report dated Aug. 7, 2007 from the corresponding PCT/JP2007/061884.
International Preliminary Report on Patentability and the Written Opinion of the International Searching Authority dated Feb. 24, 2009, from the corresponding International Application.

(Continued)

*Primary Examiner* — Mike Rahmjoo
(74) *Attorney, Agent, or Firm* — Katten Muchin Rosenman LLP (57) ABSTRACT

To provide an image display control device capable of displaying a process for switching images in a manner readily recognizable by an observer when sequentially displaying a plurality of images on a display device. An image display control device displays a first image at a predetermined position in a predetermined display area, then repetitively carries out a process for producing and displaying a first transitional image in which the first image is displayed at a first display position in the display area, with brightness lowered for at least a partial area in the display area, while moving the first display position in a direction going away from the predetermined position, then repetitively carries out a process for producing and displaying a second transitional image in which a second image is displayed at a second display position in the display area, with the brightness lowered for at least the partial area in the display area, while moving the second display position in a direction approaching the predetermined position, and thereafter displays the second image at the predetermined position.

8 Claims, 7 Drawing Sheets

FOREIGN PATENT DOCUMENTS

| | | | |
|---|---|---|---|
| JP | 2002305705 | A | 10/2002 |
| JP | 2004222175 | A | 8/2004 |
| JP | 2005351991 | A | 12/2005 |
| JP | 200747758 | A | 2/2007 |

OTHER PUBLICATIONS

Notice of Rejection dated Mar. 29, 2011, from corresponding Japanese Application No. 2006-222965.

* cited by examiner

IMAGE DISPLAY CONTROL DEVICE, IMAGE DISPLAY METHOD, AND INFORMATION STORAGE MEDIUM

TECHNICAL FIELD

The present invention relates to an image display control device, an image display method, and an information storage medium for sequentially displaying a plurality of images on a display device.

BACKGROUND ART

There is available an image display control device for sequentially displaying, for example, a plurality of photographic images captured by a user on a digital still camera, as a slide show on a screen of a display device.

DISCLOSURE OF THE INVENTION

Problems to be Solved by the Invention

For sequential displaying of a plurality of images, using such an image display control device, simple sequential displaying of statistic images may lack an entertaining nature. In view of the above, an image showing a process for gradually switching from a state in which one image is displayed to another in which a next image is displayed may be shown. In this case, however, gradual appearance of the next image on the screen may lack accent, and an observer cannot recognize at a glance whether or not the currently shown image is one representing a switching process or one to be displayed in the slide show.

The present invention has been conceived in view of the above, and one of the objects of the present invention is to provide an image display control device, an image display method, and an information storage medium capable of displaying, when sequentially displaying a plurality of images on a display device, an image showing that one image is gradually changing to another in a readily recognizable manner for an observer.

Means for Solving the Problems

An image display control device according to the present invention for achieving the above described objects is an image display control device for sequentially displaying a first image and a second image in a predetermined display area on a display device, comprising a first image display unit for displaying the first image at a predetermined position in the display area; a first transitional image display unit for repetitively carrying out, after the first image is displayed in the display area, a process for producing and displaying a first transitional image in which the first image is displayed at a first display position in the display area, with brightness lowered for at least a partial area in the display area, while moving the first display position in a direction going away from the predetermined position; a second transitional image display unit for repetitively carrying out a process for producing and displaying a second transitional image in which the second image is displayed at a second display position in the display area, with the brightness lowered for at least a partial area in the display area, while moving the second display position in a direction approaching the predetermined position; and a second image display unit for displaying the second image at the predetermined position after the first transitional image and the second transitional image are repetitively displayed.

In the above described image display control device, the first transitional image display unit may repetitively carry out the process for producing and displaying the first transitional image, while gradually lowering the brightness of at least a partial area in the display area, and the second transitional image display unit may repetitively carry out the process for producing and displaying the second transitional image, while gradually increasing the brightness of at least a partial area in the display area.

The above described image display control device may further comprise a first less bright image display unit for repetitively carrying out, after the first image is displayed in the display area, a process for producing and displaying a first less bright image in which the first image is displayed at the predetermined position, with the brightness lowered for at least a partial area in the display area, while gradually lowering the brightness, and a second less bright image display unit for repetitively carrying out, after the second transitional image is repetitively displayed, a process for producing and displaying a second less bright image in which the second image is displayed at the predetermined position, with the brightness lowered for at least a partial area in the display area, while gradually increasing the brightness, wherein the first transitional image display unit, after the first less bright image is repetitively displayed, may repetitively carry out the process for producing and displaying the first transitional image, the second transitional image display unit, after the first transitional image is repetitively displayed, may repetitively carry out the process for producing and displaying the second transitional image, and the second image display unit, after the second less bright image is repetitively displayed, may display the second image.

The above described image display control device may further comprise a first blur image producing unit for producing a first blur image obtained by carrying out a blur process on the first image; and a second blur image producing unit for producing a second blur image obtained by carrying out the blur process on the second image, wherein the first transitional image display unit may produce the first transitional image, using the first blur image, and the second transitional image display unit may produce the second transitional image, using the second blur image.

The image display method according to the present invention is an image display method for sequentially displaying a first image and a second image in a predetermined display area on a display device, comprising a step of displaying the first image at a predetermined position in the display area; a step of repetitively carrying out, after the first image is displayed in the display area, a process for producing and displaying a first transitional image in which the first image is displayed at a first display position in the display area, with brightness lowered for at least a partial area in the display area, while moving the first display position in a direction going away from the predetermined position; a step of repetitively carrying out a process for producing and displaying a second transitional image in which the second image is displayed at a second display position in the display area, with the brightness lowered for at least a partial area in the display area, while moving the second display position in a direction approaching the predetermined position; and a step of displaying the second image at the predetermined position after the first transitional image and the second transitional image are repetitively displayed.

An information storage medium according to the present invention is a computer readable information storing medium storing a program for causing a computer to function as an image display control device for sequentially displaying a first image and a second image in a predetermined display area on a display device, the computer functioning as a first image display unit for displaying the first image at a predetermined position in the display area; a first transitional image display unit for repetitively carrying out, after the first image is displayed in the display area, a process for producing and displaying a first transitional image in which the first image is displayed at a first display position in the display area, with brightness lowered for at least a partial area in the display area, while moving the first display position in a direction going away from the predetermined position; a second transitional image display unit for repetitively carrying out a process for producing and displaying a second transitional image in which the second image is displayed at a second display position in the display area, with the brightness lowered for at least a partial area in the display area, while moving the second display position in a direction approaching the predetermined position; and a second image display unit for displaying the second image at the predetermined position after the first transitional image and the second transitional image are repetitively displayed.

BEST MODE FOR CARRYING OUT THE INVENTION

In the following, one embodiment of the present invention will be described with reference to the accompanying drawings.

Figure 1:
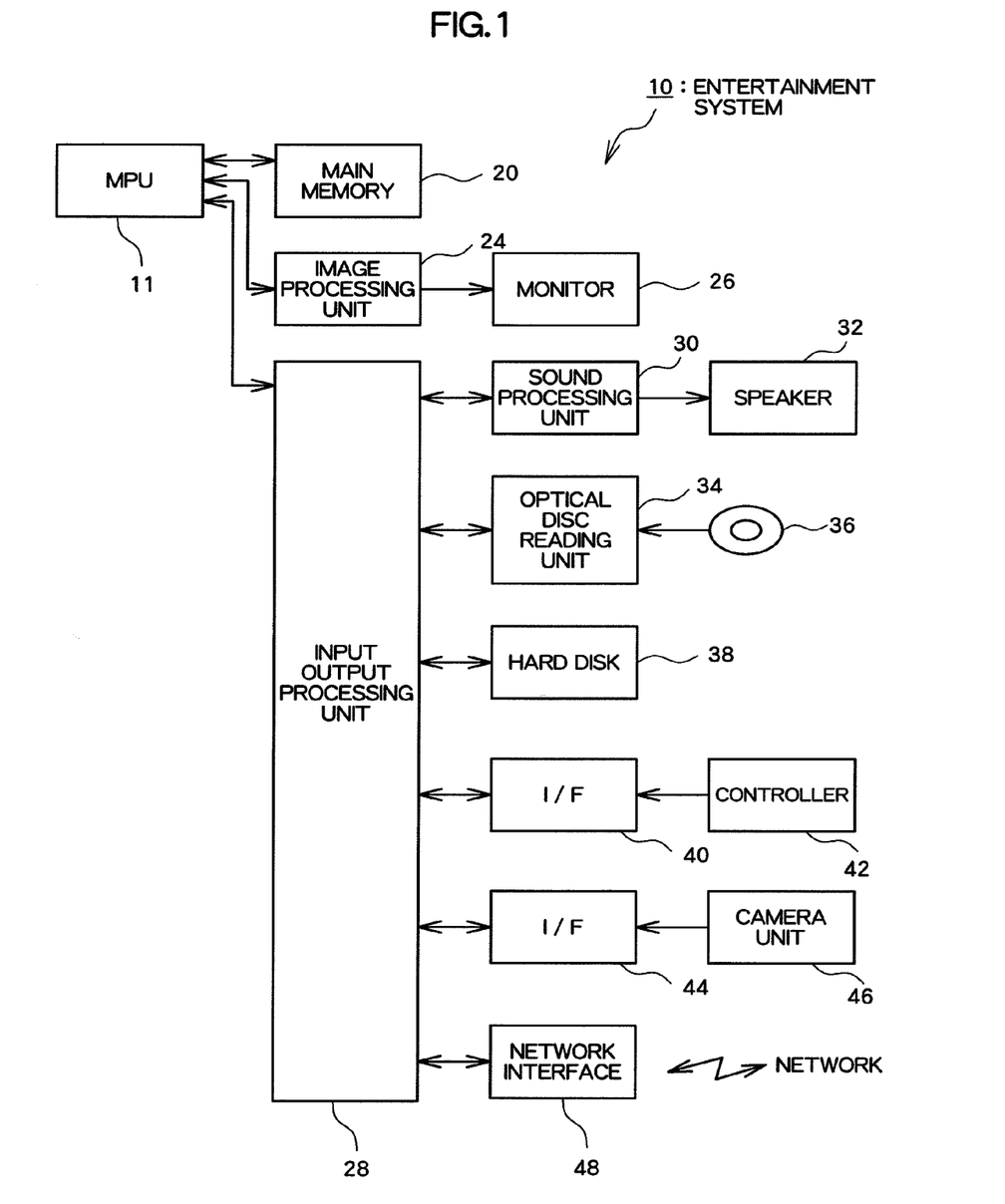
FIG. 1 is a hardware structural diagram of an entertainment system according to an embodiment of the present invention.

FIG. 1 is a diagram showing a hardware structure of an entertainment system according to this embodiment. As shown in the diagram, an entertainment system 10 is a computer system comprising an MPU (Micro Processing Unit) 11, a main memory 20, an image processing unit 24, a monitor 26, an input output processing unit 28, a sound processing unit 30, a speaker 32, an optical disc reading unit 34, an optical disc 36, a hard disk 38, interfaces (I/F) 40, 44, a controller 42, a camera unit 46, and a network interface 48.

Figure 2:
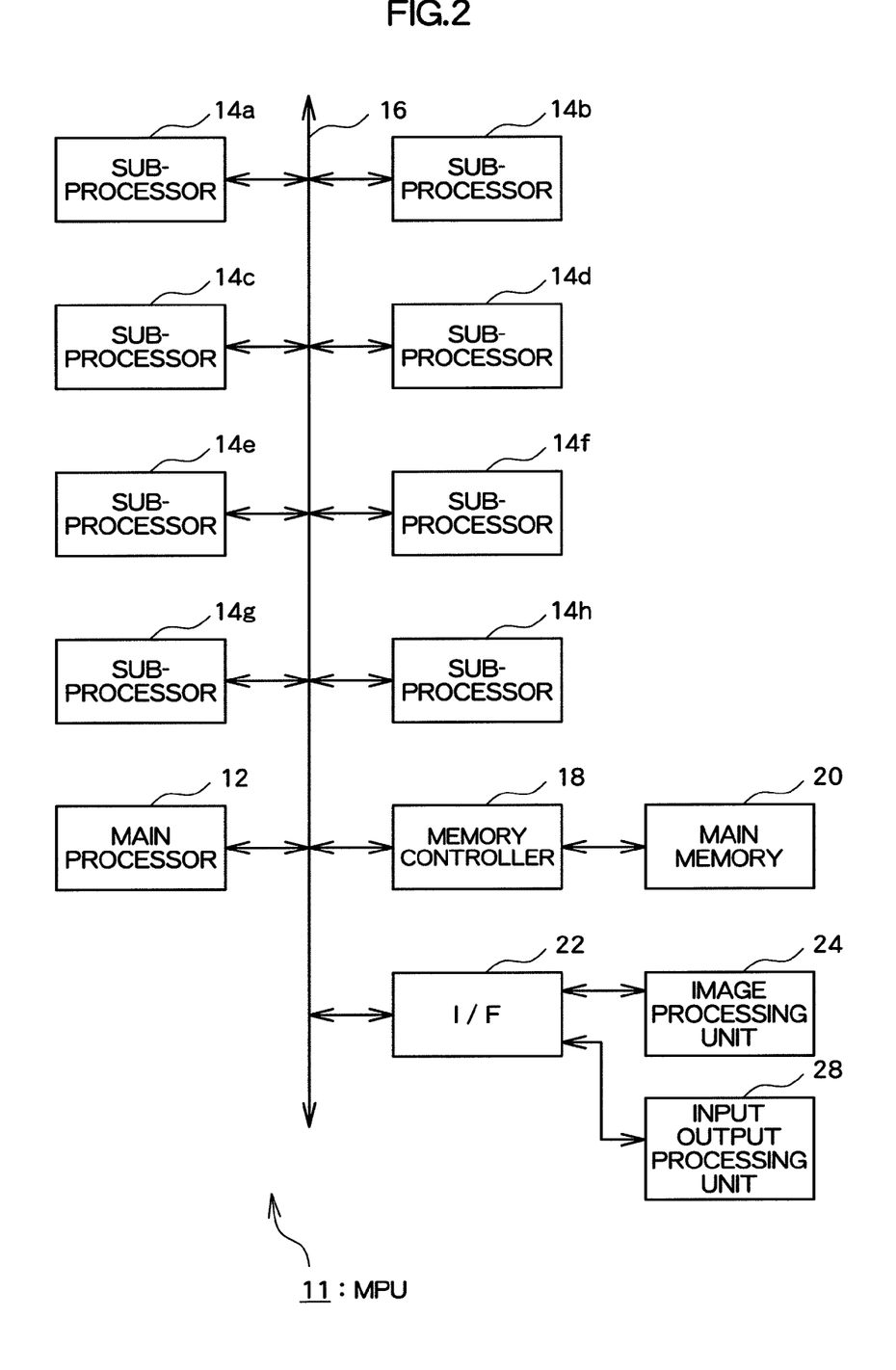
FIG. 2 is a detailed structural diagram of an MPU.

FIG. 2 is a diagram showing a structure of the MPU 11. As shown in the diagram, the MPU 11 comprises a main processor 12, sub-processors 14a, 14b, 14c, 14d, 14e, 14f, 14g, 14h, a bus 16, a memory controller 18, and an interface (I/F) 22.

The main processor 12 carries out various information processes and controls the sub-processors 14a to 14h, based on an operating system stored in a ROM (Read Only Memory) (not shown), a program and data read from the optical disc 36, such as, e.g., a DVD (Digital Versatile Disk)-ROM and so forth, and a program and data supplied via a communication network and so forth.

The sub-processors 14a to 14h carry out various information processes according to instructions from the main processor 12 and control the respective units of the entertainment system 10, based on a program and data read from the optical disc 36, such as, e.g., a DVD-ROM and so forth, and a program and data supplied via a communication network and so forth.

The bus 16 is used for exchanging an address and data among the respective units of the entertainment system 10. The main processor 12, sub-processors 14a to 14h, memory controller 18, and interface 22 are connected for mutual data exchange via the bus 16.

The memory controller 18 accesses the main memory 20 according to instructions from the main processor 12 and sub-processors 14a to 14h. A program and data read from the optical disc 36 and/or hard disk 38, and a program and data supplied via a communication network, are written into the main memory 20 as required. The main memory 20 is used as a working memory of the main processor 12 and sub-processors 14a to 14h.

The image processing unit 24 and input output processing unit 28 are connected to the interface 22. Data exchange between the main processor 12 and sub-processors 14a to 14h and the image processing unit 24 or input output processing unit 28 is carried out via the interface 22.

The image processing unit 24 comprises a GPU (Graphical Processing Unit) and a frame buffer. The GPU renders various screen images into the frame buffer, based on the image data supplied from the main processor 12 and sub-processor 14a to 14h. A screen image formed in the frame buffer is converted into a video signal at a predetermined time and output to the monitor 26. It should be noted that a home-use television set receiver, for example, may be used as the monitor 26.

To the input output processing unit 28, the sound processing unit 30, optical disc reading unit 34, hard disk 38, and interfaces 40, 44 are connected. The input output processing unit 28 controls data exchange between the main processor 12 and sub-processors 14a to 14h and the sound processing unit 30, optical disc reading unit 34, hard disk 38, interfaces 40, 44, and network interface 48.

The sound processing unit 30 comprises an SPU (Sound Processing Unit) and a sound buffer. The sound buffer stores various kinds of sound data, such as game music, game sound effect, a message, and so forth, read from the optical disc 36 and/or hard disk 38. The SPU reproduces the various kinds of sound data, and outputs via the speaker 32. It should be noted that e.g., a built-in speaker of a home-use television set receiver may be used as the speaker 32.

The optical disc reading unit 34 reads a program and data recorded in the optical disc 36 according to an instruction from the main processor 12 and/or sub-processors 14a to 14h. It should be noted that the entertainment system 10 may be formed capable of reading a program and data stored in a computer readable information storage medium other than the optical disc 36.

The optical disc 36 is a general optical disc (e.g., a computer readable information storage medium), such as, e.g., a DVD-ROM or the like. The hard disk 38 is a general hard disk device. Various programs and data are recorded in the optical disc 36 and/or hard disk 38 in a computer readable manner.

The interfaces (I/F) 40, 44 are interfaces for connecting various peripheral devices, such as the controller 42, camera unit 46, and so forth. As such an interface, a USB (Universal Serial Bus) interface etc. may be used. A radio communication interface, a Bluetooth (registered trademark) interface, or the like, may be also used.

The controller 42 is a general purpose operation input means, and is used by a user to input various operations (such as a game operation). The input output processing unit 28 scans the states of the respective units of the controller 42 every predetermined period of time (e.g., 1/60th of a second), and supplies an operational signal describing the scanning result to the main processor 12 and sub-processors 14a to 14h. The main processor 12 and sub-processors 14a to 14h determine the content of an operation carried out by the user, based on the operational signal. It should be noted that the entertainment system 10 is formed adapted to connection of a plurality of controllers 42 so that the main processor 12 and sub-processors 14a to 14h can carry out various processes, based on the operation signals input from the respective controllers 42.

The camera unit 46 comprises, for example, a publicly known digital camera, and inputs a captured black and white, grayscale, or color image every predetermined period of time (e.g., 1/60th of a second). The camera unit 46 in this embodiment inputs a captured image as image data in the JPEG (Joint Photographic Experts Group) format. The camera unit 46 is mounted on the monitor 26, with the lens thereof, e.g., directed to the player, and is connected via a cable to the interface 44. The network interface 48 is connected to the input output processing unit 28 and a communication network to relay data communication by the entertainment system 10 via the communication network to another entertainment system 10.

In this embodiment, the entertainment system 10 having the above described hardware structure operates as an image display control device for sequentially displaying a plurality of images as a slide show in a predetermined display area A on a display device. In the following, a function realized by the entertainment system 10 in this case will be described. Note that the monitor 26 corresponds to the display device in this embodiment. The display area A may be the entire screen of the monitor 26 or a partial area thereof.

Figure 3:
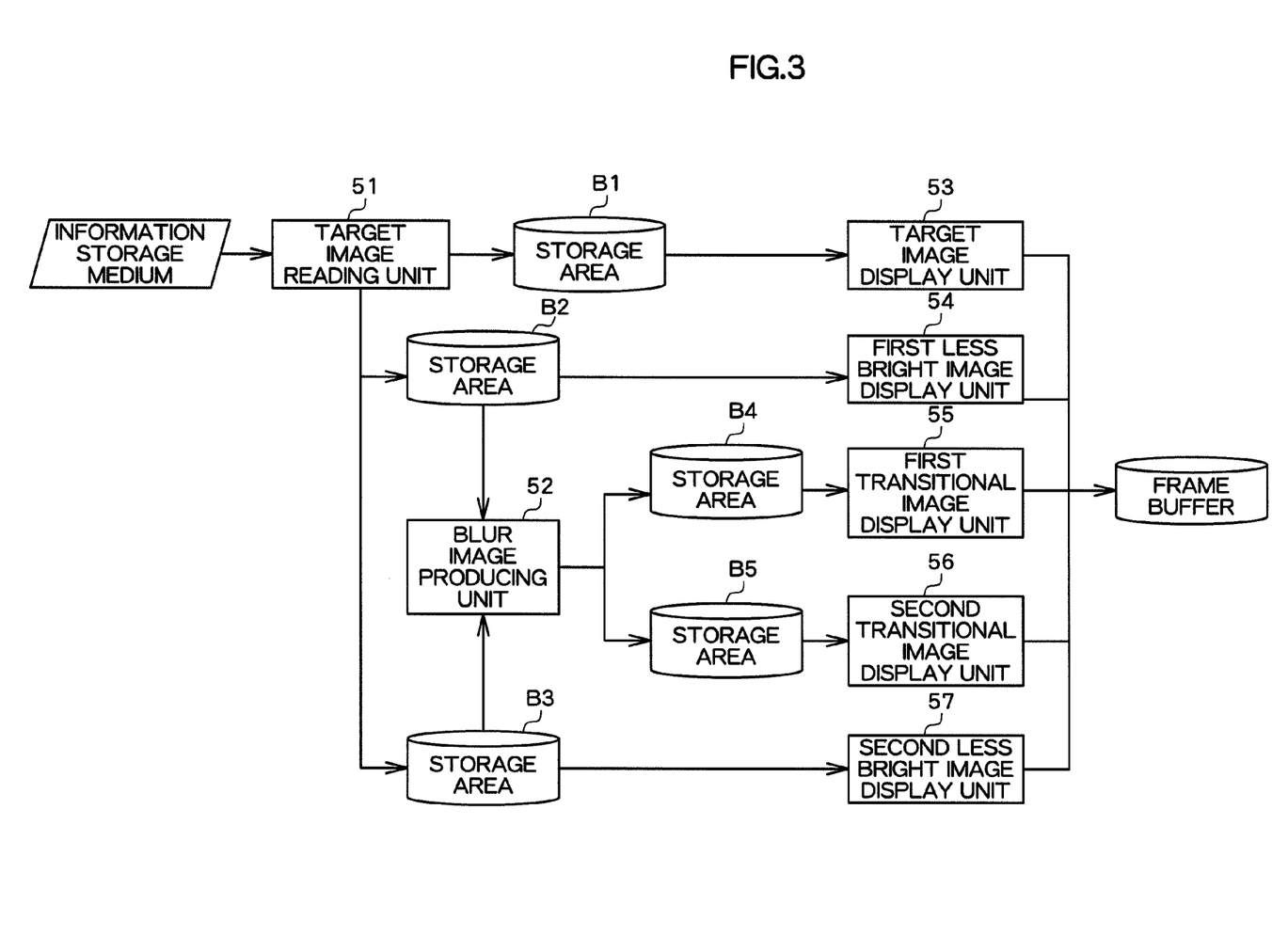
FIG. 3 is a functional block diagram showing example functions of the entertainment system according to the embodiment of the present invention.

As shown in FIG. 3, the entertainment system 10 in this case functionally comprises a target image reading unit 51, a blur image producing unit 52, a target image display unit 53, a first less bright image display unit 54, a first transitional image display unit 55, a second transitional image display unit 56, and a second less bright image display unit 57. These functions can be realized by, for example, the MPU 11 and the GPU included in the image processing unit 24, operating according to a program stored in the main memory 20.

Initially, functions realized by the target image reading unit 51 and blur image producing unit 52 will be described. With these functions, data of images to be displayed as a slide show (hereinafter referred to as a target image) is read from various information recording media, and predetermined image processing and the like is carried out. In this embodiment, it is assumed that image data output by means of these functions is stored in a predetermined temporary storage area ensured in the main memory 20. In the following description, as shown in FIG. 3, it is assumed that storage areas B1, B2, B3, B4, and B5 are ensured as storage areas for temporal storage of image data.

The target image reading unit 51 reads target image data, and temporarily stores the read data in a predetermined storage area. It is assumed that the target image data is stored in various kinds of information recording media, such as, for example, the optical disc 36, the hard disk 38, and the like, and the target image reading unit 51 reads these data items via the input output processing unit 28. The target image reading unit 51 may carry out a process for converting the read image data into a predetermined display data format (e.g., a bit map image format).

In this embodiment, it is assumed that the target image reading unit 51 temporarily stores the image data having been read from the information recording medium and converted into a predetermined data format in the storage area B1 in the main memory 20. In addition, the target image reading unit 51 may store data of a reduced image in a storage area different from the storage area B1, the reduced image being a target image for the reduced number of pixels. For example, for JPEG image data, for example, stored in the information recording medium, a reduced image for the halved number of pixels in the vertical and horizontal lines (quartered as a whole) can be produced through a relatively simple process. Thus, it is assumed that such reduced image data is produced and stored in the storage area B2 or B3. The storage area B2 or B3, where reduced image data is to be stored, may be smaller in size than the storage area B1, where target image data without reduction is to be stored. Accordingly, memory capacity used in carrying out a slide show display process can be reduced.

The target image reading unit 51 reads the respective target images in an order determined based on a predetermined condition. In the following, a case of target images which include first and second images will be described as a specific example. That is, it is assumed that the entertainment system 10 according to this embodiment displays the first and second images in this order on the monitor 26. In this case, the target image reading unit 51 initially stores the first image in the storage area B1 and then a first image which is reduced (hereinafter referred to as a first reduced image) in the storage area B2. Further, a second image which is reduced (hereinafter referred to as a second reduced image) is stored in the storage area B3. The reduced image data stored in the storage areas B2 and B3 is to be used by the first less bright image display unit 54 and second less bright image display unit 57, to be described later. Then, at a predetermined time, the target image reading unit 51 reads the second image, or a display target subsequent to the first image, and stores the read second image in the storage area B1 where the first image was stored. While repeating these processes, the target image reading unit 51 reads a plurality of target images in the display order, and stores the read target images in the predetermined storage area.

The blur image producing unit 52 produces a blur image obtained by carrying out a blur process on a target image. The blur process is a process for producing motion blur effect on an image. As a specific example, the blur image producing unit 52 carries out pixel value correction for each of the pixels of a process target image, using a method described below. That is, while determining each pixel as a process target, a weighting average of the pixel value of the pixel determined as a process target, and the pixel values of pixels (nearby pixels) located near that pixel in a predetermined positional relationship to that pixel, is calculated, and the pixel value of that pixel is corrected using the calculated weighting average value. In this case, it is assumed that a weighting coefficient for the pixel values of the nearby pixels of the process target pixel is changed, depending on the direction and distance from the process target pixel to the respective nearby pixels. With the above, an effect as if an after-image were produced in a predetermined direction relative to the image can be produced.

It is assumed here that the blur image producing unit 52 carries out a predetermined blur process, based on the data of the first reduced image having been stored in the storage area B2 by the target image reading unit 51, to thereby produce a first blur image, and stores the produced first blur image in the storage area B4. Likewise, a second blur image is produced, based on the data of the second reduced image stored in the storage area B3, and stored in the storage area B5. The data of the blur images stored in the storage areas B4 and B5 are to be used by the first transitional image display unit 55 and second transitional image display unit 56, to be described later.

Note that the blur image producing unit 52 may produce a blur image smaller than the reduced image, based on the reduced image data. With the above, the size of the storage area B4 or B5 can be reduced to even smaller than that of the storage area B2 or B3, which can realize further reduction of the memory capacity used in carrying out a slide show display process.

In the following, functions realized by the target image display unit 53, first less bright image display unit 54, first transitional image display unit 55, second transitional image display unit 56, and second less bright image display unit 57 will be described. With these functions, an image to be displayed on the screen of the monitor 26 is produced, based on the target image read by the target image reading unit 51 or the blur image produced by the blur image producing unit 52, and output to a frame buffer included in the image processing unit 24. With the above, control can be realized for sequentially displaying the target images in the display area A on the monitor 26.

Specifically, the target image display unit 53 initially displays the first image in the display area A, followed by displaying of an image showing that the target image is gradually changing from the first image to the second image by the first less bright image display unit 54, first transitional image display unit 55, second transitional image display unit 56, and second less bright image display unit 57, to be described later. Thereafter, the target image display unit 53 displays the second image in the display area A.

Figure 4:
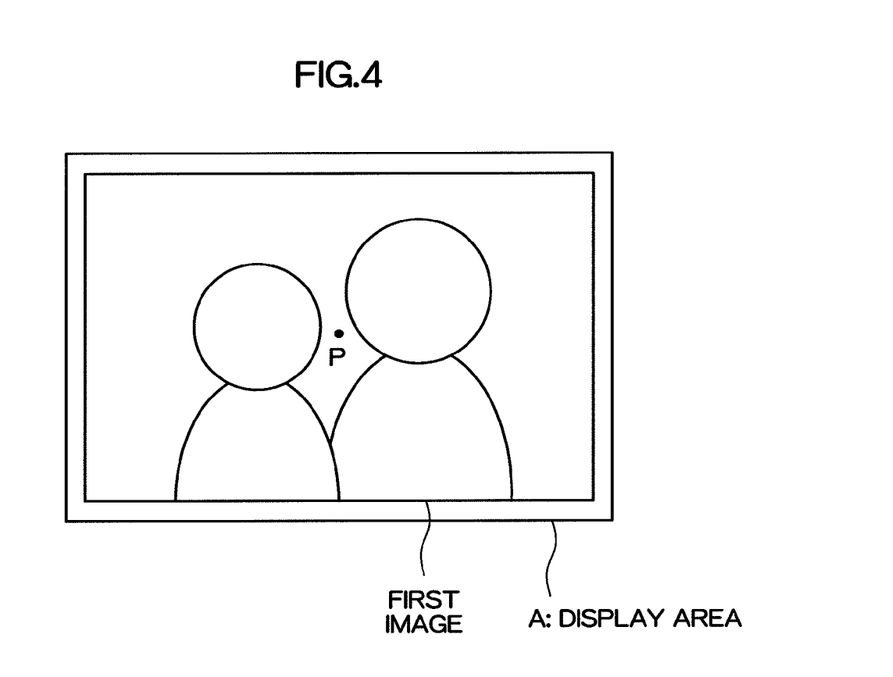
FIG. 4 is a diagram explaining one example of a target image displayed in a display area.

That is, the target image display unit 53 displays the target image at a predetermined position (hereinafter referred to as a reference position P) in the display area A. For example, the target image display unit 53 displays the respective target image in the display area A for every predetermined period of time, based on the target image data read from the storage area B1 (that is, a target image is newly displayed in the display area A every predetermined period of time). Note that the reference position P is, e.g., the central position of the display area A. The target image display unit 53 produces an image in which the target image is placed with the representative position (e.g., the central position) thereof falling on the reference position P, and outputs the produced image. As a result, the target image is displayed in the reference position P on the screen of the monitor 26. FIG. 4 is a diagram explaining one example of the target image displayed in the display area A.

After the target image display unit 53 displays the first image in the display area A, the first less bright image display unit 54 repetitively carries out a process for producing a first less bright image and displaying the produced image in the display area A. Note that the first less bright image is an image in which the first image is shown in the reference position P, with brightness lowered for at least a partial area in the display area A. It is assumed that the first less bright image display unit 54 repeats the process for producing and displaying the first less bright image, while gradually reducing the brightness of the partial area.

Note that the first less bright image display unit 54 may produce the first less bright image, using the first reduced image obtained by reducing the first image. In the above, it is assumed that the first reduced image is displayed enlarged, so as to be as large as the target image displayed in the display area A, by the target image display unit 53. In this case, the first image displayed as the first less bright image results in a rough resolution image. However, as the first less bright image is merely an image showing that the target image is changing, the first less bright image less needs to have high image quality, compared to the image displayed by the target image display unit 53. Meanwhile, use of the reduced image can reduce the data transmission amount in the repetitive production and displaying of the first less bright image, which can improve the process speed. As a specific example, the first less bright image display unit 54 reads the first reduced image from the storage area B2, and produces the first less bright image, based on the first reduced image.

In the following, a specific example of the first less bright image will be described. The first less bright image display unit 54 applies gamma correction to the respective pixels for the first reduced image, to thereby produce an image with brightness corrected. Then, the resultant gamma-corrected image and a predetermined light source are placed in a virtual three dimensional space, and an image showing a picture obtained by viewing the gamma-corrected image from a predetermined viewpoint position in the virtual three dimensional space is produced as a first less bright image. In the above, the irradiation direction of the light source in the virtual three dimensional space is determined such that a predetermined irradiation range in the produced first less bright image is irradiated by the above described predetermined light source. The first less bright image is an image in which a part thereof within the irradiation range is expressed with the brightness resulting from application of gamma correction to the original first reduced image and the remaining part thereof with brightness lowered due to lack of light reaching thereto from the light source.

Note that the area shown with lowered brightness, and the remaining area, may not be clearly distinguishable with the above described irradiation range. For example, the first less bright image may be an image in which the brightness for pixels farther from the reference position P, as the center, becomes gradually lower.

Figure 5:
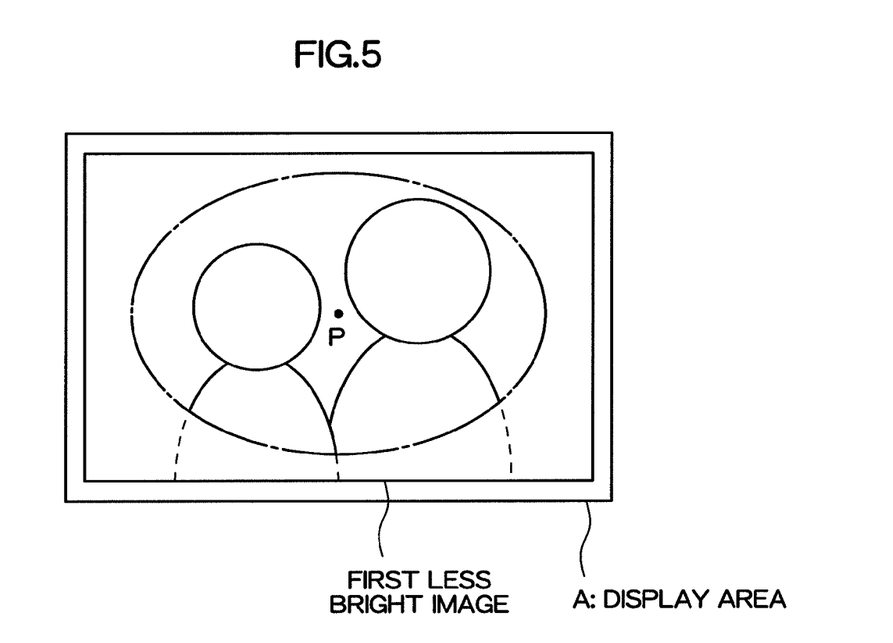
FIG. 5 is a diagram explaining one example of a first less bright image.

FIG. 5 is a diagram explaining one example of the first less bright image. In the example shown in FIG. 5, the alternate long and short dash line indicates the boundary of the irradiation range, and the contour of the person indicated by the broken line represents lower brightness outside the irradiation range.

It is assumed that the first less bright image display unit 54 repeats the process for producing the first less bright image, while gradually narrowing the irradiation range of the light source. In addition to the above, the process may be repeated, while gradually reducing the light amount of the light source. Further, the process may be repeated, while gradually changing a parameter for gamma correction. With the above, the first less bright image display unit 54 can present a picture in which the first image shown in the display area A becomes gradually darker to be hardly visible.

After the target image display unit 53 displays the first image in the display area A, the first transitional image display unit 55 repetitively carries out a process for producing a first transitional image and displaying the produced image in the display area A. It is assumed in this embodiment that the first transitional image display unit 55 carries out this process after the first less bright image display unit 54 repetitively displays the first less bright image. Note that the first transitional image is an image in which the first image is shown in the first display position in the display area A, with brightness lowered for at least a partial area in the display area A. It is also assumed that the first transitional image display unit 55 repeats the process for producing and displaying the first transitional image, while moving the first display position in a direction going away from the reference position P.

As a specific example, it is assumed that the first transitional image display unit 55 repeats the process for producing the first transitional image, while, for example, moving the first display position from the reference position P in a predetermined direction (e.g., leftward when facing the screen) by every predetermined amount. The resultant first transitional images are sequentially displayed in the display area A, whereby a picture in which the first image moves in a direction going away from the reference position P, where the first image is initially displayed, is shown on the screen of the monitor 26.

Note that the first transitional image display unit 55 may produce the first transitional image, using the first blur image produced, based on the first image. This allows a user looking at the image to intuitively realize that the image is moving in a direction going away from the reference position P. As a specific example, the first transitional image display unit 55 reads the first blur image from the storage area B4, and produces the first transitional image based on the first blur image. Note that, also in this case, the first blur image is displayed enlarged so as to be as large as the target image displayed by the target image display unit 53.

Further, the first transitional image display unit 55 may repeat the process for producing and displaying the first transitional image, while gradually lowering the brightness of at least a partial area in the display area A. Specifically, for example, similar to the example of the above described first less bright image display unit 54, an image resulting from application of gamma correction to the first blur image and a predetermined light source are placed in the virtual three dimensional space, and an image showing a picture obtained by viewing the image from a predetermined viewpoint position in the virtual three dimensional space is produced. Then, the process for producing the image viewed from the viewpoint position and displaying the resultant image in the display area A is repeated, while gradually moving the gamma-corrected image in a predetermined direction and changing the light amount and irradiation range of the light source. Note that the viewpoint position and light source position in the virtual three dimensional space may remain unchanged in the above. By moving the gamma-corrected first blur image while maintaining the viewpoint position unchanged in the virtual three dimensional space, as described above, a picture in which the first image moves in a direction going away from the reference position P can be displayed on the screen of the monitor 26.

In the above, the first transitional image display unit 55 may determine a brightness correction parameter (a light source position, a light amount, or an irradiation range, or a gamma correction parameter, and the like) for use in production of the first transitional image, based on the brightness correction parameter used by the first less bright image display unit 54 when producing the immediately preceding first less bright image. With the above, a picture in which the display area A becomes continuously darker can be displayed when the first transitional image display unit 55 repetitively displays the first transitional images after the first less bright image display unit 54 repetitively displays the first less bright images.

Figure 6:
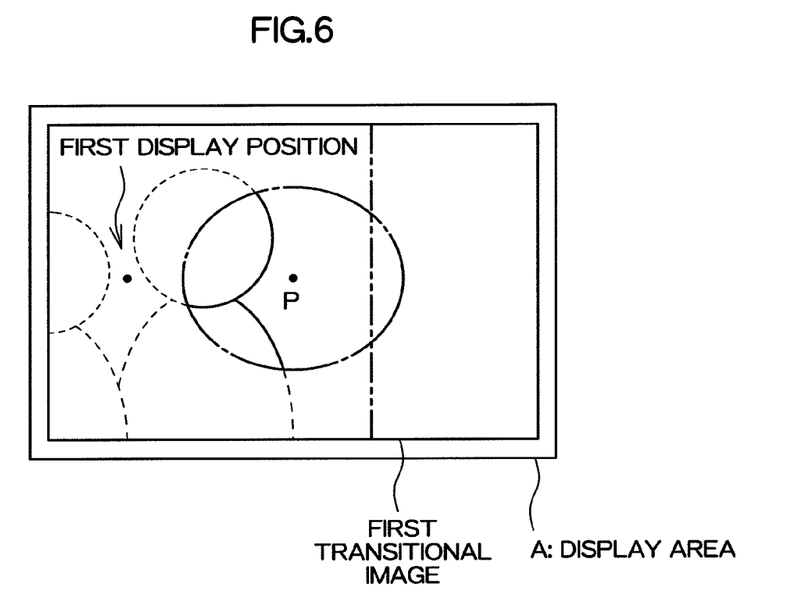
FIG. 6 is a diagram explaining one example of a first transitional image.

FIG. 6 is a diagram explaining one example of the first transitional image. Note that similar to the example shown in FIG. 5, the alternate long and short dash line indicates the boundary of the irradiation range; the broken line indicates the contour of the person with lowered brightness; and the long dashed double-short dashed line indicates the periphery of the first image (a first blur image) in the first transitional image.

The second transitional image display unit 56 repetitively carries out a process for producing and displaying a second transitional image. It is assumed in this embodiment that the second transitional image display unit 56 carries out this process after the first transitional image display unit 55 repetitively displays the first transitional image. Note that the second transitional image is an image in which the second image is displayed at the second display position in the display area A, with brightness lowered for at least a partial area in the display area A. It is also assumed that the second transitional image display unit 56 repeats the process for producing and displaying the second transitional image, while moving the second display position in a direction approaching the reference position P.

Specifically, it is assumed that, e.g., the second transitional image display unit 56 repeats the process for producing the second transitional image, while moving the second display position by every predetermined amount in a direction same as that in which the first transitional image display unit 55 moves the first display position. In the above, the second display position when producing the initial second transitional image may be a predetermined position or a position symmetrical to, for example, the first display position where the immediately preceding first transitional image is displayed by the first transitional image display unit 55, with the reference position P in-between. With the above, a picture in which the second image moves from a position on the other side in the display area A toward the reference position P can be displayed on the screen of the monitor 26 after the first image moves away from the reference position P.

Also, similar to the first transitional image display unit 55, the second transitional image display unit 56 may produce the second transitional image, using the second blur image produced based on the second image. As a specific example, the second transitional image display unit 56 reads the second blur image from the storage area B5, and produces the second transitional image, based on the read second blur image.

Further, the second transitional image display unit 56 may repeat the process for producing and displaying the second transitional image, while gradually increasing the brightness of at least a partial area in the display area A. In this case, it is assumed that, e.g., the second transitional image display unit 56 changes the brightness of the display area A, using a method similar to that used by the first transitional image display unit 55. That is, second transitional images subjected to correction identical to that applied to the brightness of the respective pixels in the display area A, for each of the first transitional images sequentially produced by the first transitional image display unit 55 are produced in the order reversed from that related to the first transitional image display unit 55, and displayed in the display area A.

Further, the brightness, for the respective pixels in the display area A, of the initial second transitional image to be produced by the second transitional image display unit 56 may be determined, based on the brightness correction parameters for the respective pixels used when the first transitional image display unit 55 produces the immediately preceding first transitional image. With the above, a picture in which the display area A becomes gradually brighter, from the level of brightness at the time when display, on the monitor 26, of a picture in which the display area A becomes gradually darker is completed, can be displayed on the monitor 26.

Figure 7:
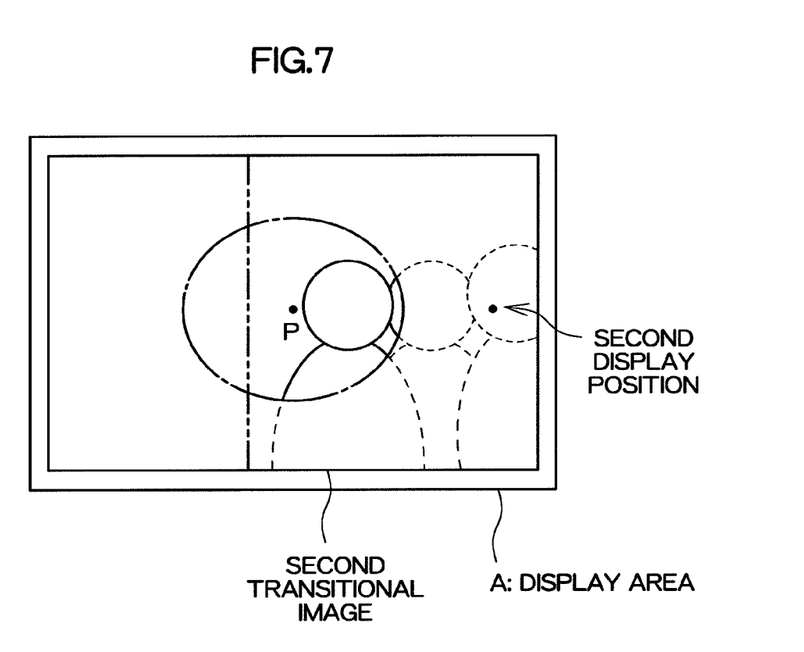
FIG. 7 is a diagram explaining one example of a second transitional image.

FIG. 7 is a diagram explaining one example of the second transitional image. Note that similar to the example shown in FIG. 6, the alternate long and short dash line indicates the boundary of the irradiation range; the broken line indicates the contour of the person with lowered brightness; and the long dashed double-short dashed line indicates the periphery of the second image (the second blur image) in the second transitional image.

After the second transitional image display unit 56 repetitively displays the second transitional image, the second less bright image display unit 57 repetitively carries out a process for producing and displaying a second less bright image. Note that the second less bright image is an image in which the second image is shown in the reference position P, with brightness lowered for at least a partial area in the display area A. It is assumed that the second less bright image display unit 57 repeats the process for producing and displaying the second less bright image, while gradually increasing the brightness of the partial area.

Similar to the first less bright image display unit 54, the second less bright image display unit 57 may produce the second less bright image, using the second reduced image obtained by reducing the second image. As a specific example, it is assumed that the second less bright image display unit 57 repetitively carries out a process for reading the second reduced image from the storage area B3, and producing and displaying the second less bright image, based on the second reduced image.

For example, the second less bright image display unit 57 produces the second less bright image, using a method similar to that used by the first less bright image display unit 54. That is, the second less bright images subjected to correction identical to that carried out for the brightness of the respective pixels in the display area A for each of the first less bright images sequentially produced by the first less bright image display unit 54 are produced in the order reversed from that for the first less bright image display unit 54, and displayed in the display area A. With the above, the second less bright image display unit 57 can produce a picture in which the second image displayed in the display area A becomes gradually brighter to be clearly displayed.

Also, a brightness correction parameter for use in correcting the brightness of the initial second less bright image to be produced by the second less bright image display unit 57 may be determined, based on the brightness correction parameter used by the second transitional image display unit 56 when producing the immediately preceding second transitional image. With the above, a picture in which the display area A becomes continuously brighter can be displayed when repetitively displaying the second less bright images after the second transitional images are repetitively displayed.

It is assumed that the above described first less bright image display unit 54, first transitional image display unit 55, second transitional image display unit 56, and second less bright image display unit 57 repeat the process for producing and displaying the respective images until respective predetermined conditions are satisfied. For example, it is assumed that the processes for producing and displaying the respective images are respectively repeated a predetermined number of times. The first transitional image display unit 55 may repeat the process for producing and displaying the first transitional image until the first display position has reached a predetermined position. As a specific example, the first transitional image display unit 55 may repeat the process until the first display position has moved to a position which leaves the entire first image outside the display area A. The second transitional image display unit 56 may repeat the process for producing and displaying the second transitional image until the second display position reaches the reference position P.

The process for outputting the respective images to the frame buffer by the first less bright image display unit 54, first transitional image display unit 55, second transitional image display unit 56, and second less bright image display unit 57 may be repeated at every predetermined time (e.g., a time according to a vertical synchronous signal for the monitor 26).

Figure 8:
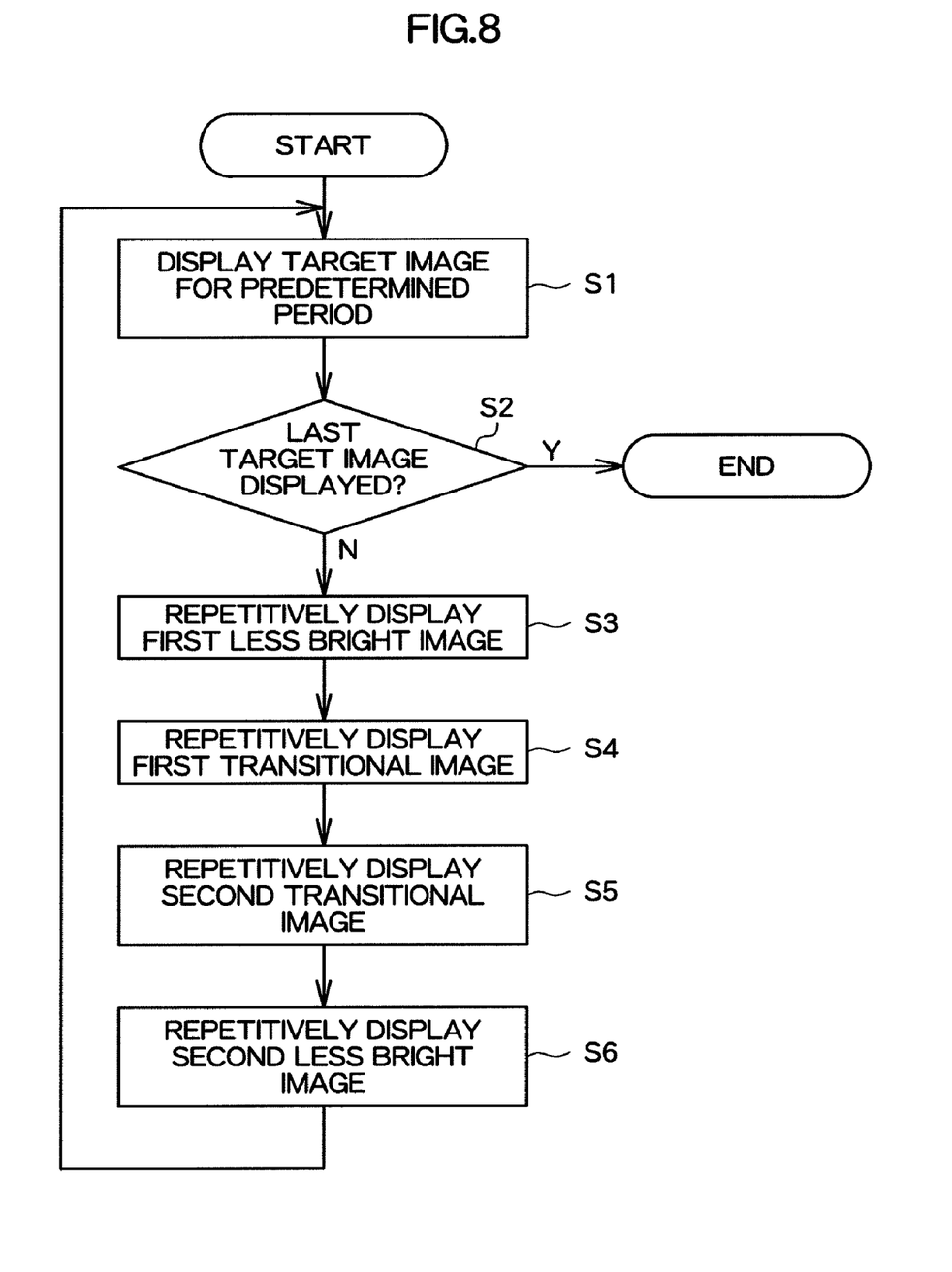
FIG. 8 is a flowchart of one example of a process to be carried out by the entertainment system according to the embodiment of the present invention.

In the following, one example of a flow of a slide show display process for sequentially displaying the target images in the display area A on the monitor 25 by the target image display unit 53, first less bright image display unit 54, first transitional image display unit 55, second transitional image display unit 56, and second less bright image display unit 57, will be described, based on the flowchart in FIG. 8.

Initially, the target image display unit 53 reads a target image (a first image, here) from the storage area B1 and outputs the read target image to the frame buffer so that the target image is displayed in the display area A for a predetermined period of time (S1). With the first image having been displayed in the display area A for a predetermined period of time, whether or not the target image displayed at S1 is the last target image to be displayed is determined (S2). When it is known through the determination that the last target image is displayed, the slide show display process is terminated. Meanwhile, as the first image here is not the last target image and there is a target image to be displayed next (a second image here), the subsequent process at S3 is carried out.

Subsequently, the first less bright image display unit 54 repeats the process for producing the first less bright image, based on the first reduced image read from the storage area B2, and displaying the produced first less bright image in the display area A (S3). Further, the first transitional image display unit 55 repeats the process for producing the first transitional image, based on the first blur image read from the storage area B4, and displaying the produced first transitional image in the display area A (S4). Still further, the second transitional image display unit 56 repeats the process for producing the second transitional image, based on the second blur image read from the storage area B5, and displaying the produced second transitional image in the display area A (S5). Then, the second less bright image display unit 57 repeats the process for producing the second less bright image, based on the second reduced image read from the storage area B3, and displaying the produced second less bright image in the display area A (S6).

After an image showing that the first image is gradually changing to the second image is displayed in the display area A through the processes from S3 to S6, the process at S1 is carried out again so that the target image display unit 51 displays the second image to be displayed next in the display area A. The above described process is repeated until determination is made in the process at S2 that the last target image is displayed.

Note that it is assumed that the target image reading unit 51 begins the process for storing the target image to be displayed next on the target image display unit 53 in the storage area B1 when the process at S3 begins. With the above, the target image reading unit 51 can carry out the process for storing a target image to be displayed next in the storage area B1 while the processes from S3 to S6 are being carried out. With the above, the entertainment system 10 according to this embodiment can sequentially display the target images on a real time basis even without ensuring a plurality of storage areas B1 for storing the target image. Note that in the case where the process by the target image reading unit 51 for storing a new target image in the storage area B1 is not completed yet by the time the processes up to S6 are completed, the target image reading unit 51 may keep displaying the reduced image stored in the storage area B3 in the display area A until the processes are completed. In this case, the target image display unit 53 switches the image to display from the reduced image to the target image without reduction according to the time at which the target image reading unit 51 completes storage of the target image in the storage area B1.

Also, it is assumed that the process by the target image reading unit 51 for storing the first reduced image and second reduced image in the storage areas B2 and B3, respectively, and the process by the blur image producing unit 52 for storing the first blur image and second blur image in the storage areas B4 and B5, respectively, are carried out while the first image is kept displayed for a predetermined period of time at S1.

In the following, an example of detailed processes from S3 to S6 will be described, based on the flowchart shown in FIG. 9, referring to the process at S3 by the first less bright image display unit 54 as an example.

Initially, the first less bright image display unit 54 reads the first reduced image stored in the storage area B2 (S11). Then, the first less bright image is produced, based on the read first reduced image, then output to the frame buffer, and displayed on the monitor 26 (S12). Thereafter, a brightness correction parameter, such as the light amount and irradiation range of the light source, a gamma correction parameter, and so forth, used in the process at S12 are changed (S13). Subsequently, the first less bright image display unit 54 determines whether or not the process has been repeated until the predetermined condition is satisfied (S14). When it is determined that the predetermined condition is satisfied, the process is terminated, and the next process by the first transitional image display unit 55 (S4) begins. Meanwhile, when it is determined that the predetermined condition is not satisfied yet, the flow returns to S11 to repeat the process to further display the first less bright image, based on the parameter changed at S13.

Figure 9:
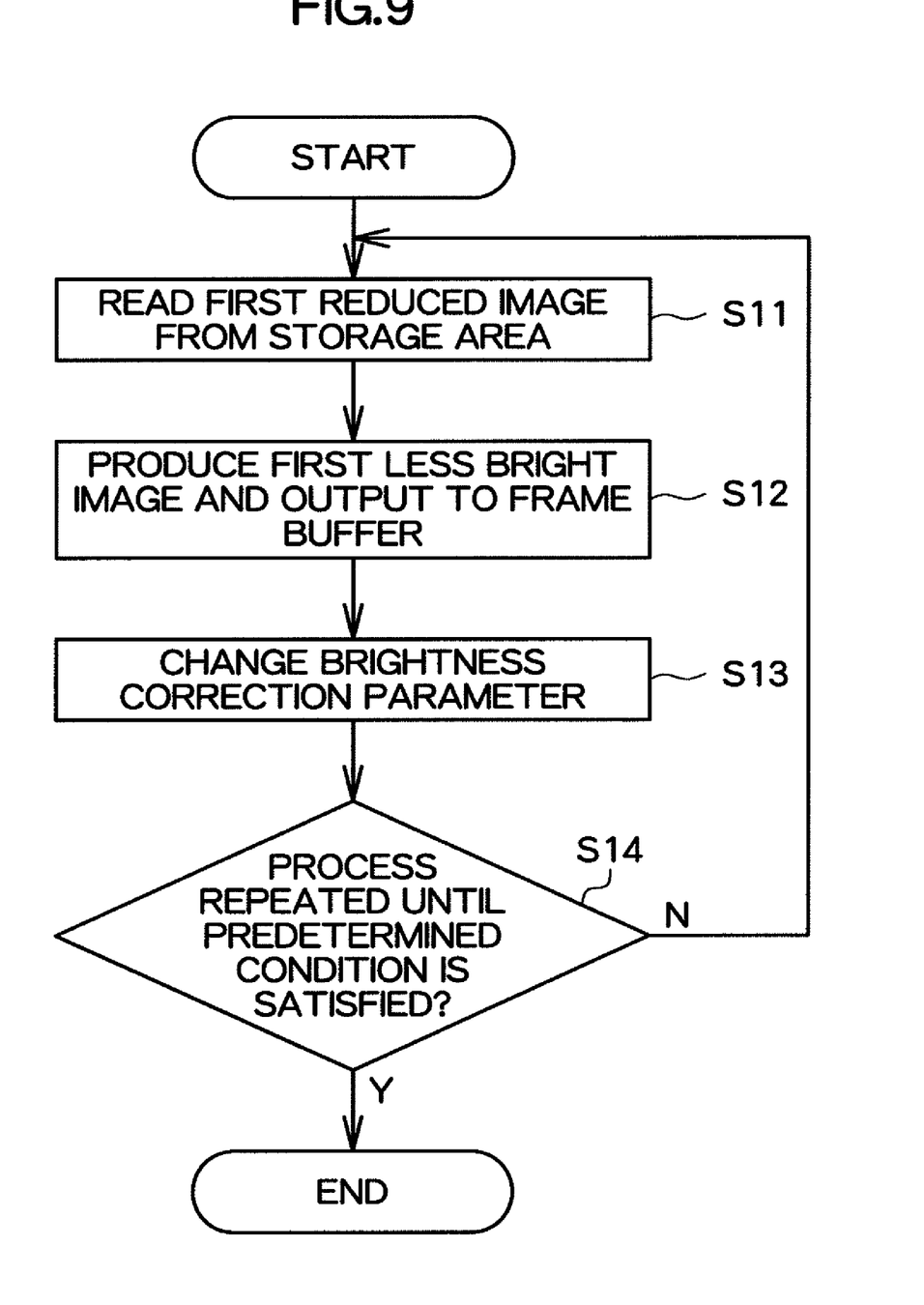
FIG. 9 is a flowchart of one example of a process to be carried out by a first less bright image display unit.

Note that the processes from S4 to S6 can be realized, following the process flow similar to that shown in the flowchart in FIG. 9, except that a different image may be read at S11, a different image may be produced at S12, and the first display position or second display position may be changed at S13 in addition to the brightness correction parameter.

According to the above described embodiment, displaying a process for switching the image with lowered brightness for the display area A enables presentation as if slides were switched on a projector. This helps an observer realize the image switching process.

Note that the embodiment of the present invention is not limited to the above described embodiment. For example, the first less bright image display unit 54 and second less bright image display unit 57 are omissible. With the omission, displaying of the transmission image begins immediately when switching from the first image to the second image.

Although it is described in the above that displaying of the second transitional image begins after displaying of the first transitional image ends, these images may be formed as a common image. That is, a process for producing and displaying a transitional image in which the first and second images are shown at the first and second display positions, respectively, as an image showing the process for switching from the first image to the second image, with brightness lowered for at least a partial area in the display area A, is repetitively carried out, while moving the first and second display positions. With the above, a picture in which the first and second images move side by side in the display area A can be displayed on the screen of the monitor 26.

The invention claimed is:

1. An image display control device for sequentially displaying a first image and a second image in a display area on a display device, comprising:
    first image display means for displaying the first image at a predetermined position in the display area;
    first transitional image display means for:
        producing a first transitional image based on the first image;
        displaying the first transitional image at a first display position in the display area, wherein brightness of the display area is lowered for at least a partial area of the display area; and
        moving the first display position and the first transitional image in a direction away from the predetermined position;
    second transitional image display means for:
        producing a second transitional image based on the second image;
        displaying the second transitional image at a second display position in the display area; and
        moving the second display position and the second transitional image in a direction approaching the predetermined position; and
    second image display means for displaying the second image at the predetermined position when the second display position reaches the predetermined position.

2. The image display control device according to claim 1, wherein, as the first transitional image display means moves the first display position in a direction away from the predetermined position, the first transitional display means also gradually lower the brightness of the partial area of the display area.

3. The image display control device according to claim 1, further comprising:
    first less bright image display means for gradually lowering the brightness of the first image after the first image display means displays the first image at the predetermined position.

4. The image display control device according to claim 1, further comprising:
    first blur image producing means for producing a first blur image by carrying out a blur process on the first image; and
    second blur image producing means for producing a second blur image by carrying out the blur process on the second image,
    wherein the first transitional image display means produces the first transitional image using the first blur image, and
    the second transitional image display means produces the second transitional image using the second blur image.

5. The image display control device according to claim 1, wherein as the second transitional image display means moves the second display position in a direction approaching the predetermined position, the second transitional display means also gradually increases the brightness of the partial area of the display area.

6. The image display control device according to claim 1, further comprising:
    second less bright image display means for displaying the second image at the predetermined position having reduced brightness and gradually increasing the brightness of the second image prior to the second image display means displaying the second image.

7. An image display method executed by a processor for sequentially displaying a first image and a second image in a display area on a display device, comprising:
displaying the first image at a predetermined position in the display area;
producing a first transitional image from the first image;
displaying the first transitional image at a first display position with brightness lowered for at least a partial area in the display area;
moving the first display position and the first transitional image in a direction away from the predetermined position;
producing a second transitional image from the second image with brightness lowered for at least a partial area in the display area;
displaying the second transitional image at a second display position;
moving the second display position and the second transitional image in a direction approaching the predetermined position; and
displaying the second image at the predetermined position after the second display position reaches the predetermined position.

8. A non-transitory computer readable information storage medium storing a program for causing a computer to function as an image display control device for sequentially displaying a first image and a second image in a display area on a display device, the computer functioning as:
first image display means for displaying the first image at a predetermined position in the display area;
first transitional image display means for: producing a first transitional image based on the first image;
displaying the first transitional image at a first display position in the display area, wherein brightness of the display area is lowered for at least a partial area of the display area; and
moving the first display position and the first transitional image in a direction away from the predetermined position;
second transitional image display means for:
a second transitional image based on the second image;
displaying the second transitional image at a second display position in the display area with the brightness lowered for at least a partial area in the display area; and
moving the second display position and the second transitional image in a direction approaching the predetermined position; and
second image display means for displaying the second image at the predetermined position when the second display position reaches the predetermined position.

* * * * *